United States Patent [19]

Eller

[11] 4,095,709

[45] Jun. 20, 1978

[54] UNDER BODY SPARE TIRE CARRIER

[76] Inventor: Dennis E. Eller, 331 N. Thorington St., Algona, Iowa 50511

[21] Appl. No.: 736,196

[22] Filed: Oct. 27, 1976

[51] Int. Cl.² .......................................... B62D 43/04
[52] U.S. Cl. ................................ 214/454; 224/42.21;
224/42.23; 296/37.2
[58] Field of Search ............... 296/37.2; 214/451, 452,
214/453, 454; 224/42.12, 42.21, 42.23, 42.06

[56] References Cited

U.S. PATENT DOCUMENTS

| | | | |
|---|---|---|---|
| 2,325,848 | 8/1943 | Gildea | 214/451 |
| 2,563,810 | 8/1951 | Ballard | 214/451 |
| 2,777,591 | 1/1957 | Manzatuik | 214/451 |
| 2,981,427 | 4/1961 | Walker | 214/453 X |
| 3,330,431 | 7/1967 | Knecht | 214/454 |
| 3,494,493 | 2/1970 | Fowler | 214/454 |

*Primary Examiner*—Joseph F. Peters, Jr.
*Assistant Examiner*—R. Schrecengost
*Attorney, Agent, or Firm*—Clarence A. O'Brien; Harvey B. Jacobson

[57] ABSTRACT

A first elongated horizontal support arm has one inner end thereof anchored to one of the side longitudinal frame members of a vehicle adjacent the rear end thereof. The other free end of the support arm projects laterally outwardly from the vehicle frame but terminates inwardly of the corresponding rear side body portion of the vehicle. The other free end of the support arm includes upstanding guide structure from which an upstanding support member is mounted for guided vertical shifting relative thereto and adjustment structure is carried by the outer free end of the support arm and is operatively connected to the support member for shifting the latter relative to the guide structure and retaining the support member in vertically shifted position. The outer end of the support member supports one end of a second horizontal arm therefrom having base and free end portions with the base end portion of the second arm mounted on the lower end of the support member for angular displacement relative thereto about an upstanding axis and swinging of the second arm between a first position with the free end portion thereof projecting toward the other longitudinal side frame member of the vehicle and a second position with the free end portion of the second arm projecting rearwardly from the vehicle. The second arm includes structure defining an upwardly facing receptacle area for receiving the spare wheel and tire of the vehicle therein and the spare wheel and tire receiving area is disposed fully rearwardly of the rear marginal edge of the vehicle when the second arm is in the second position thereof.

10 Claims, 4 Drawing Figures

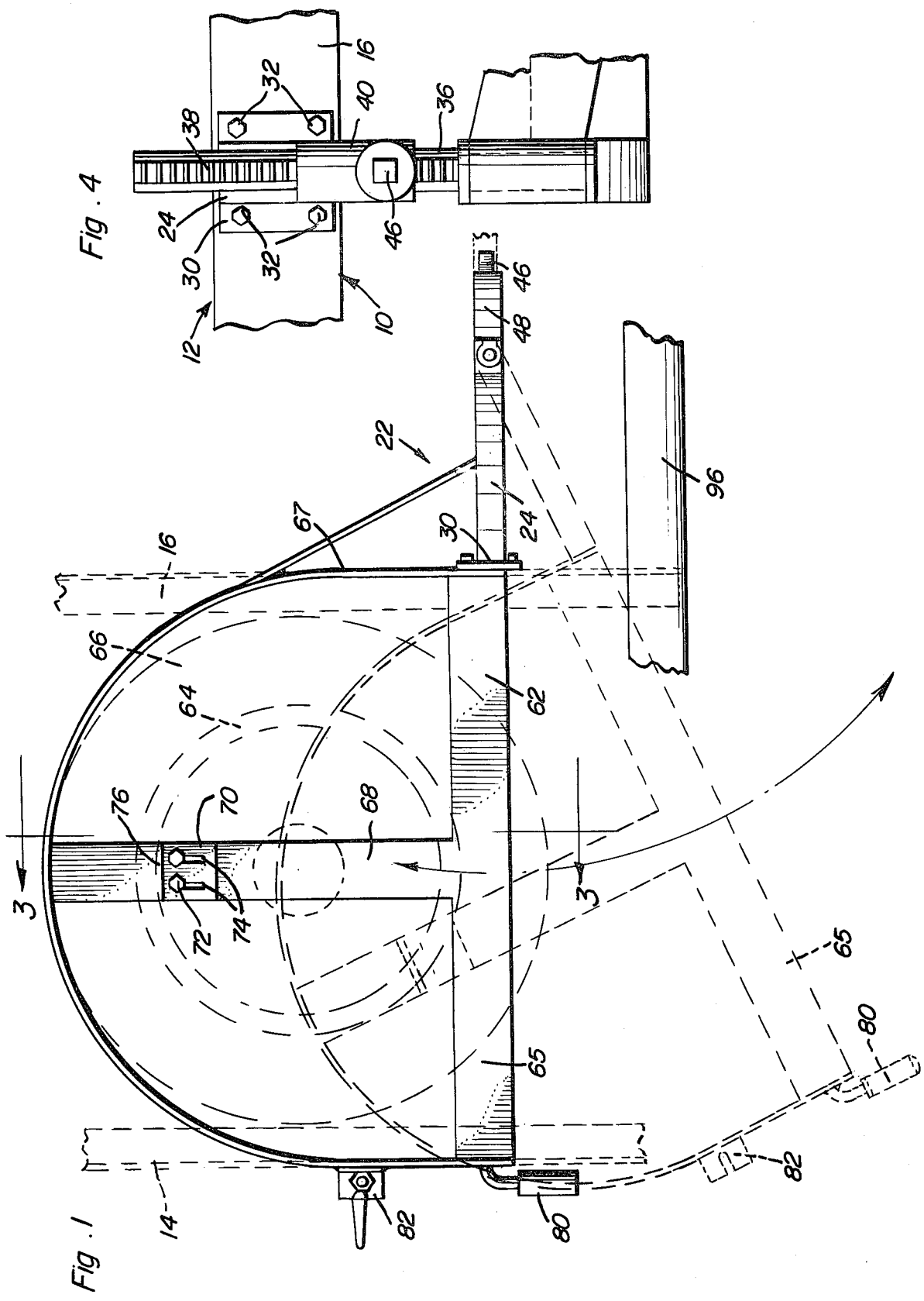

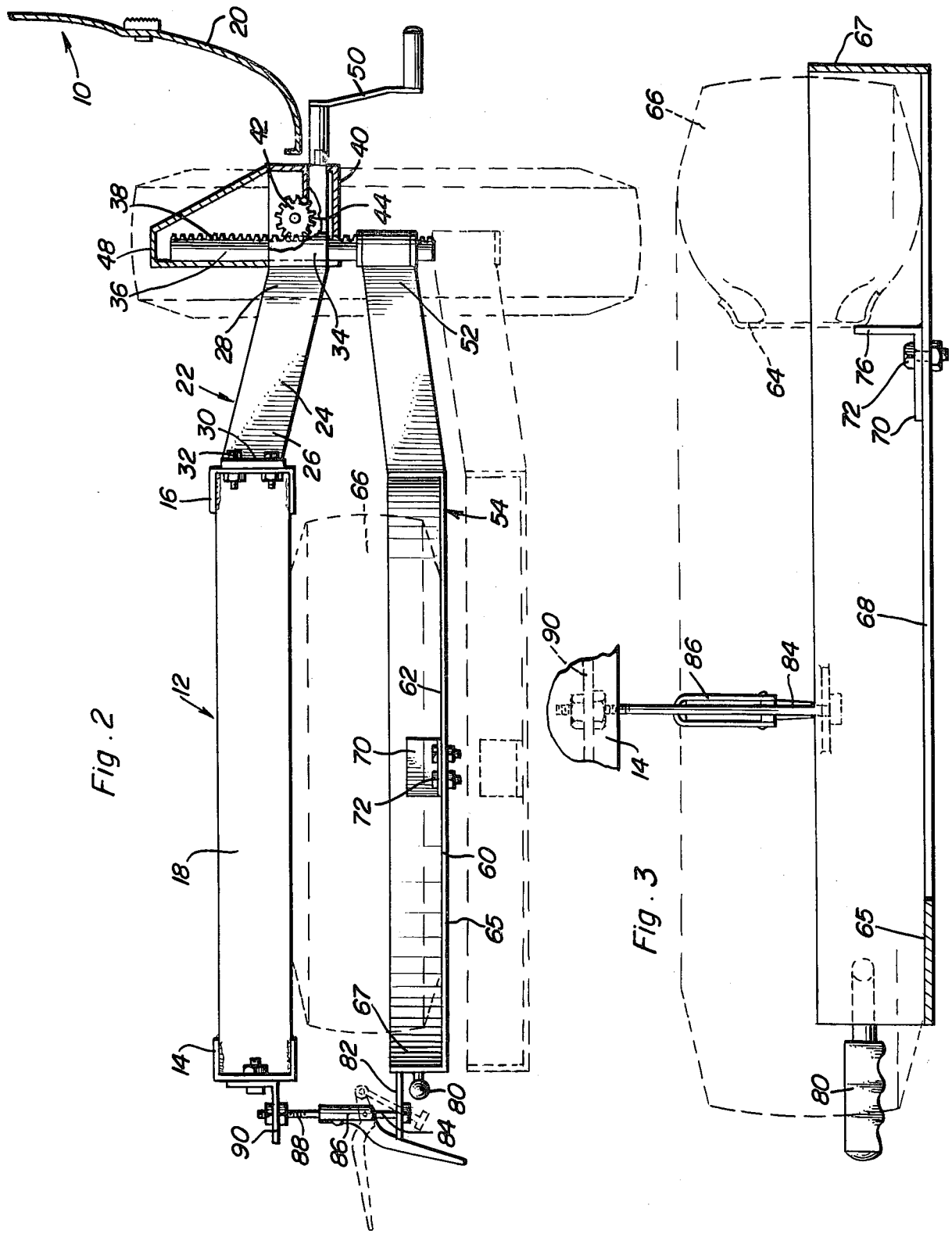

UNDER BODY SPARE TIRE CARRIER

BACKGROUND OF THE INVENTION

Various forms of carriers have been provided for supporting spare wheels and tires of truck-type vehicles in positions slung immediately beneath the rear of the vehicles. While various forms of these spare tire carriers are fully operative to perform their intended function, many are difficult to utilize, particularly when a spare tire and wheel to be removed therefrom and to be replaced thereon is of the heavy duty type representing a considerable weight load. In addition, other forms of spare tire carriers heretofore provided are difficult to operate and are sometimes not readily adaptable for use on substantially all types of pickup-truck vehicles.

Examples of spare tire carriers including some of the general structural and operational features of the instant invention are disclosed in U.S. Pat. Nos. 2,028,945, 2,325,848, 2,563,810, 2,777,591, 2,981,427 and 3,330,431.

BRIEF DESCRIPTION OF THE INVENTION

The spare tire carrier of the instant invention utilizes a horizontal support arm having one end thereof secured to the rear portion of one longitudinal side frame member of the associated pickup truck adjacent the rear end thereof. The other end of the support arm projects outwardly from that side of the frame to a point closely adjacent but spaced slightly inwardly of the corresponding rear side body portion of the pickup truck. The outer end of the support arm defines a vertical pivot axis for one end of a second support arm swingable between a first position projecting toward the opposite side of the associated vehicle and a second position extending appreciably from the rear of the vehicle. The free end of the second support arm includes structure defining an upwardly opening spare tire and wheel receiving area which is disposed completely rearwardly of the rear of the associated pickup truck when the second support arm is disposed in the second rearwardly projecting position thereof. In this manner, a spare tire to be loaded into the carrier or unloaded therefrom may be readily placed into or removed from its position supported from the carrier. Further, the pivot axis structure by which the second support arm is pivotally mounted on the outer end of the first support arm includes means whereby the second support arm may be raised and lowered.

The main object of this invention is to provide a spare tire carrier for a pickup truck or van constructed in a manner enabling a spare tire supported therefrom to be readily removed when needed.

Another object of this invention is to provide a spare tire carrier which may be mounted on substantially all pickup trucks and vans.

Yet another object of this invention is to provide a spare tire carrier constructed in a manner enabling a spare tire supported therefrom to be swung into and out of position stored in an underslung manner beneath the rear frame of a pickup truck or van.

Another important object of this invention is to provide a spare tire carrier including structure whereby it may be readily elevated and lowered relative to the associated vehicle.

A further object of this invention is to provide a spare tire carrier which may be locked in position with the spare tire and wheel supported therefrom in an underslung position beneath the rear of the associated truck or van.

A final object of this invention to be specifically enumerated herein is to provide a spare tire carrier in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary top plan view of the frame portion of a pickup truck with the spare tire carrier of the instant invention operatively associated with the frame;

FIG. 2 is a rear elevational view of the assemblage illustrated in FIG. 1;

FIG. 3 is a fragmentary enlarged vertical sectional view taken substantially upon the plane indicated by the section line 3—3 of FIG. 1; and FIG. 4 is a side elevational view of the mechanism by which that portion of the spare tire carrier designed to cradle the spare wheel and tire may be raised and lowered relative to the associated truck frame.

DETAILED DESCRIPTION OF THE INVENTION

Referring now more specifically to the drawings the numeral 10 generally designates a conventional form of pickup truck including a frame referred to in general by the reference numeral 12. The frame 12 includes opposite side longitudinal frame members 14 and 16 interconnected by a plurality of transverse frame members 18. The rear end portions of the frame members 14 and 16 support a rear transverse bumper therefrom defining the rearmost marginal portion of the truck 10. Further, the truck 10 includes a rear outer side body portion 20 which is disposed appreciably outwardly of the rear portion of the frame member 16.

The spare tire carrier of the instant invention is referred to in general by the reference numeral 22 and includes a first substantially horizontal support arm 24 having a first base end 26 and a second outer free end 28. The base end 26 is provided with a transverse mounting plate 30 welded thereto and secured to the outer surface of the rear portion of the frame member 16 by means of suitable fasteners 32.

The outer free end 28 of the support arm 24 includes a vertical sleeve portion 34 through which an elongated upstanding support member 36 is slidingly received, the support member 36 including rack gear teeth 38 spaced along the outer side thereof.

In addition, the outer end 28 of the support arm 24 includes a gear housing 40 supported therefrom in which a worm wheel 42 and a worm gear 44 are journaled. The worm gear 44 is meshed with the worm wheel 42 and includes a non-circular outer end portion 46 which projects outwardly of the outer side of the housing 40. The worm wheel 42 is in turn meshed with the rack gear teeth 38 and the entire upper portion of the housing 40 is closed by means of a cover 48 which also encloses the upper end of the support member 36.

A crank 50 is provided and is removably engageable with the non-circular end portion 46 in order to apply rotational torque thereto when desired and the base end portion 52 of a second support arm referred to in general by the reference numeral 54 is mounted on the lower end portion of the support member 36 projecting below the housing 40 for angular displacement relative to the support member 36 between a first position with the second support arm 54 extending substantially transversely of the vehicle 12 and toward the frame member 14 and a second position with the support arm 54 projecting substantially rearwardly from the support member 36. The first end 52 of the support arm 54 is oscillatable on the lower end of the support member 36, but is supported against shifting axially of the support member 36.

The free end portion 60 of the support arm 54 defines a generally horizontally disposed U-shaped and rearwardly and upwardly opening storage cradle 62 for cradling a spare wheel 64 and spare tire 66 of the vehicle 10 therein. The cradle 62 includes a first transverse member 65 and a second horizontally disposed U-shaped member 67 opening toward and secured to the opposite ends of the member 65. In addition, a third member 68 extends between the mid-portion of the member 65 and the mid-portion of the member 67. An L-shaped abutment flange 70 is secured to the member 68 by means of fasteners 72 secured through slots 74 in the abutment member 70 whereby the latter may be slightly shifted in position longitudinally of the member 68 and the upwardly projecting vertical flange 76 thereof may be utilized to engage the inside of the wheel 64 to prevent its shifting in the cradle 62 away from the closed end of the U-shaped member 67.

The free terminal end of the second support arm 54 includes a handle 80 and the corresponding side of the U-shaped member 67 includes an outwardly projecting notched retaining flange 82 with which the lower headed end 84 of an over-center toggle-type tensioning member 86 may be engaged, the upper end 88 of the tensioning member 86 being secured through a retaining bracket 90 secured to the frame member 14.

In operation, and assuming that the spare tire carrier 22 is in the position thereof illustrated in FIG. 2 supporting a spare wheel and tire beneath the frame 12 of the vehicle 10, should it be necessary to remove the spare tire and wheel the tension member 86 is released and the headed lower end thereof is disengaged from the slotted flange or bracket 82. Thereafter, the crank 50 is removed from the interior of the truck 10 and is engaged with the non-circular end portion 46 of the worm gear 44 and utilized to lower the support member 36 to the phantom line position thereof illustrated in FIG. 2. Then, the handle 80 may be grasped in order to swing the second support arm 54 from the solid line position thereof illustrated in FIG. 1 of the drawings through the phantom line position thereof in FIG. 1 and to a position with the support arm 54 projecting substantially rearwardly of the vehicle 10. In this position, the cradle 62 is disposed completely rearwardly of the bumper 96 of the vehicle 10 and the spare tire and wheel may be readily lifted from within the cradle 62 and placed upon the ground. Of course, when it is desired to re-load the spare tire and wheel beneath the frame 12 of the vehicle 10 the above process is reversed. The upstanding flange 76 is fully operative to retain the spare tire and wheel in position within the cradle 62 when the support arm 54 is elevated to the solid line position thereof in FIG. 2, inasmuch as the spare tire is clamped between the members 65 and 68 of the cradle 62 and the transverse frame member 18.

After the spare tire and wheel have been re-loaded, the crank 50 is removed and the tension member 86 is re-applied thereby locking the spare tire and wheel as well as the second support arm 54 of the spare tire carrier in the transport position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle having a body and a frame including opposite side longitudinal frame members laterally outwardly beyond whose rear end portions outer opposite side rear body portions of said vehicle project, a spare tire carrier including a first elongated horizontal support arm having an inner base end and an outer free end, means anchoring said base end to one of said frame member rear portions with the free end of said arm projecting outwardly toward but terminating inwardly of the corresponding rear side body portion of the vehicle, the outer free end of said arm including pivot means, a second horizontal arm having base and free end portions and including upwardly opening receptacle means on its free end portion for vertically downwardly receiving therewithin the spare wheel and tire of said vehicle, said second arm having its base end portion supported from the outer free end of said first arm for angular displacement relative thereto about an upstanding axis and swinging of said second arm between a first position with the free end portion thereof projecting toward the other frame member rear portion and said receptacle means generally centered transversely of said frame and a second position with the free end portion of said second arm projecting rearwardly from said vehicle, said vehicle including a rear bumper, the spacing of said axis outwardly from said one frame member and forwardly of said bumper and the effective length of said second arm, between said axis and said receptacle means, being such to position said receptacle means, entirely, rearward of said bumper when said second horizontal arm is in said second position, whereby said wheel may be removed from said receptacle means upon vertical upward movement relative to said receptacle means.

2. The combination of claim 1 wherein the free end of said second horizontal arm and the other of said frame members include coacting latch means operative to releasably latch said second arm in said first position and to support the cantilevered weight of said second arm, said receptacle means and a wheel and tire supported therefrom from said other frame member.

3. The combination of claim 2 wherein said receptacle receiving area defined by said receptacle means also opens horizontally outwardly of one side of said second arm.

4. The combination of claim 3 wherein said one side of said second arm comprises the rear side thereof when said arm is in said first position.

5. In combination with a vehicle having a body and a frame including opposite side longitudinal frame members laterally outwardly beyond whose rear end portions outer opposite side rear body portions of said vehicle project, a spare tire carrier including a first elongated horizontal support arm having an inner base end and an outer free end, means anchoring said base end to one of said frame member rear portions with the free end of said arm projecting outwardly toward but terminating inwardly of the corresponding rear side body portion of the vehicle, the outer free end of said arm including means defining an upstanding guide means, an upstanding support member supported from said guide means for guided vertical shifting relative thereto, shifting means carried by said outer end of said support arm and operatively connected to said support member for selectively vertically shifting said support member relative to said guide means and retaining said support member in vertically shifted position, the lower end of said support member projecting downwardly below said guide means, a horizontal second arm having base and free end portions and including upwardly opening receptacle means on its free end portion for vertically downwardly receiving therewithin the spare wheel and tire of said vehicle, said second arm having its base end portion mounted on the lower end of said support member for angular displacement relative thereto about an upstanding axis and swinging of said second arm between a first position with the free end portion thereof projecting toward the other frame member rear portion and said receptacle means generally centered transversely of said frame and a second position with the free end portion of said second arm projecting rearwardly from said vehicle, said vehicle including a rear bumper, the spacing of said guide means outwardly from said one frame member and forwardly of said bumper and the effective length of said second horizontal arm, between said guide means and said receptacle means, being such to position said receptacle means, entirely, rearward of said bumper when said second horizontal arm is in said second position whereby said spare tire and wheel may be removed from said receptacle means upon vertical upward movement relative to said receptacle means.

6. The combination of claim 5 wherein the free end of said second horizontal arm and the other of said frame members include coacting latch means operative to releasably latch said second arm in said first position and to support the cantilevered weight of said second arm, said receptacle means and a wheel and tire supported therefrom from said other frame member.

7. The combination of claim 5 wherein said shifting means includes a worm gear train operatively connected between said support member and said guide means.

8. The combination of claim 5 wherein said receptacle receiving are defined by said receptacle means also opens horizontally outwardly of one side of said second arm.

9. The combination of claim 8 wherein said one side of said second arm comprises the rear side thereof when said arm is in said first position.

10. The combination of claim 5 wherein said shifting means includes a worm gear train operatively connected between said support member and said guide means, said gear train including a rotatable input shaft projecting horizontally outwardly of said guide away from said one side of said frame and adapted to have a manually operable rotary input torque tool removably coupled thereto.

* * * * *